(12) United States Patent
Carpenter

(10) Patent No.: US 8,910,677 B1
(45) Date of Patent: Dec. 16, 2014

(54) FUEL TANK FILLER PORT CAP WITH NOZZLE ADAPTER

(76) Inventor: Robert H. Carpenter, Pasadena, CA (US)

( * ) Notice: Subject to any disclaimer, the term of this patent is extended or adjusted under 35 U.S.C. 154(b) by 950 days.

(21) Appl. No.: 13/046,260

(22) Filed: Mar. 11, 2011

(51) Int. Cl.
*B65B 39/00* (2006.01)

(52) U.S. Cl.
USPC ............ 141/338; 141/86; 141/312; 220/86.2; 220/210; 220/380

(58) Field of Classification Search
USPC .................. 141/331–341, 368, 86, 312, 392; 220/86.2, 210, 380, 288; 137/592; 280/288.4, 835
See application file for complete search history.

(56) References Cited

U.S. PATENT DOCUMENTS

| 4,234,098 | A | | 11/1980 | Miller et al. |
| 4,424,839 | A | | 1/1984 | Otani et al. |
| 4,635,813 | A | | 1/1987 | Peickert |
| 4,811,763 | A | * | 3/1989 | Kupske ........................... 141/44 |
| 5,285,830 | A | | 2/1994 | Hilpipre, Jr. |
| 5,894,872 | A | * | 4/1999 | Gale .............................. 141/368 |
| D415,989 | S | | 11/1999 | Foltz |
| RE36,959 | E | * | 11/2000 | Griffin .......................... 220/210 |
| 6,209,745 | B1 | | 4/2001 | Jansson |
| 6,425,424 | B1 | * | 7/2002 | Ellis Calvo et al. .......... 141/331 |
| D477,803 | S | | 7/2003 | Norris, Jr. |
| 6,807,990 | B1 | * | 10/2004 | Hernandez et al. ........... 141/390 |

* cited by examiner

*Primary Examiner* — Jason K Niesz
(74) *Attorney, Agent, or Firm* — Robert C. Montgomery; Montgomery Patent & Design

(57) ABSTRACT

A fuel tank filler port cap assembly having an adapter for use with a vapor recovery dispensing nozzle to aid in filling a fuel tank of a motorcycle such as to allow complete filling of the tank while reducing spills and allowing the safety and environmental features of the vapor recovery dispensing nozzle to work is herein disclosed. The adapter includes a cylindrical cover base that engages the opening on the fuel tank and forms a vapor tight seal. A tubular inner sleeve is extendably from the cover base and has a top having an opening which engages the accordion-like collar on the fuel dispenser nozzle equipped with vapor recovery or vapor conservation nozzles. In such a manner, the tank and nozzle connection remain intact, but the nozzle remains mostly out of the tank allowing the fuel tank to be completely filled.

17 Claims, 4 Drawing Sheets

FUEL TANK FILLER PORT CAP WITH NOZZLE ADAPTER

RELATED APPLICATIONS

The present invention was first described in a notarized Official Record of Invention on Feb. 22, 2008, that is on file at the offices of Montgomery Patent and Design, LLC, the entire disclosures of which are incorporated herein by reference.

FIELD OF THE INVENTION

The present invention relates generally to fuel tank filler cap assemblies, and in particular, to a motorcycle fuel tank filler cap having a nozzle adapter for use with fuel dispensing nozzles.

BACKGROUND OF THE INVENTION

In order to reduce atmospheric pollution, fumes displaced from an automobile gasoline tank during filling at a filling station are often recovered. In order for the vapor recovery process to work reliably, it is important that a good seal be made between the vapor recovery shroud of the nozzle and the opening of the fill tank. While this is typically easy to accomplish on a motor vehicle with a long fill neck, it is difficult on a motorcycle fuel tank due to the fact that the opening is on the surface of the vessel with no neck. As such, the nozzle must be pushed a considerable way inside the tank body for the shroud to seal against the tank. However, the nozzle then senses the rising fuel during filling and shuts off the flow long before filling is complete. This means that the interval between tank fill ups is decreased and trip range is decreased as well.

SUMMARY OF THE INVENTION

The inventor has therefore recognized the aforementioned inherent problems and lack in the art and observed that there is a need for a device and method by which the proper operation of vapor recovery nozzles on gasoline dispensers can be provided while still allowing the tank to be completely filled. In accordance with the invention, it is an object of the present disclosure to solve these problems.

The inventor recognized these problems and has addressed this need by developing a fuel tank filler port cap with nozzle adapter that allows for the complete filling and physical protection of a motorcycle gas tank and complies with the intent and functionality of vapor recovery nozzles in a manner which is quick, easy and efficient. The inventor has thus realized the advantages and benefits of providing a cover base having an internal thread on a lower end to matingly attach to a threaded exterior of the fuel tank, an external thread on an upper end, and a central opening to access an interior of the fuel tank. An inner tubular sleeve is slidably coupled within the cover base central opening and has an outwardly protruding upper flange surface for contact with a top surface of the cover base. A cover cap having an internal thread to matingly attach to the cover base external thread is removably attached to the cover base to cover the central opening. A twist and lift locking mechanism is provided to move the inner tubular sleeve relative to the cover base. The upper end of the inner sleeve is slidable between a lowered position which is generally flush with a top of the cover base and a raised position which extends outwardly from the cover base top surface. The twist and locking mechanism retains the inner tubular sleeve when it is in the raised position. The inner tubular sleeve upper flange surface limits the downward movement of the inner tubular sleeve relative to the cover base when it is in the lowered position.

In at least one embodiment the twist and lift mechanism includes a plurality of curved receiving slots disposed at least partially through a bottom portion of an exterior side surface of the inner tubular sleeve. A plurality of pins each protrudes inwardly from an interior surface of the cover base superjacent to the internal thread. Each of the pins insertably engages a respective slot and is slidable therewithin between the lowered position and the raised position. Each of the pins is stationarily supported within its respective slot when the inner tubular sleeve is in the raised position.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY

Figure 1:
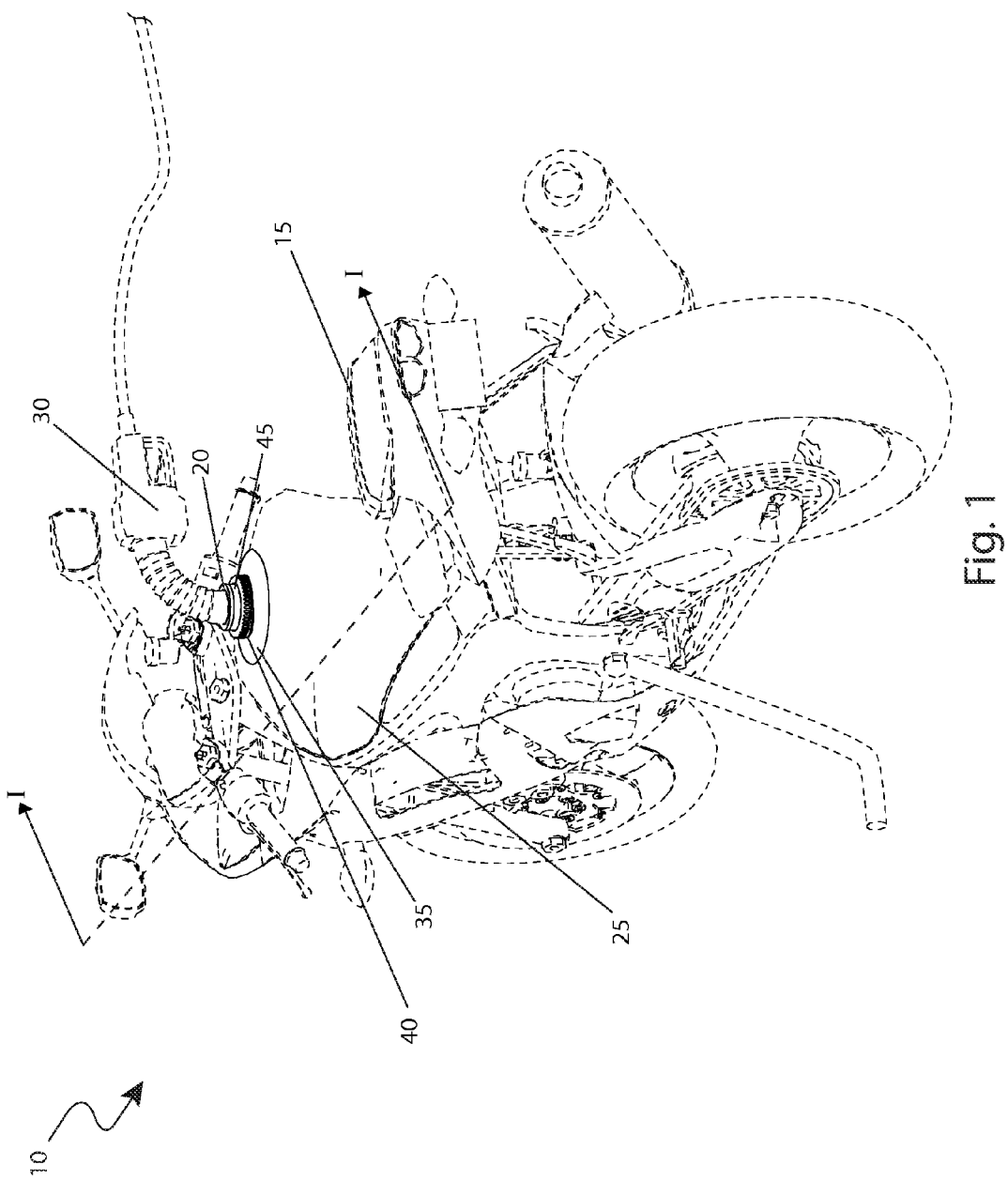
FIG. 1 is an isometric view of a fuel tank filler port cap with nozzle adapter, depicted as being utilized with a motorcycle according to a preferred embodiment in accordance with the invention.

| | |
|---|---|
| 10 | fuel tank filler port cap with nozzle adapter |
| 15 | motorcycle |
| 20 | fuel tank opening |
| 25 | fuel tank |
| 30 | vapor recovery dispensing nozzle |
| 35 | protective shield |
| 40 | cover base |
| 45 | inner sleeve |
| 50 | fuel cap |
| 55 | knurled area |
| 60 | logo area |
| 65 | bottom portion |
| 70 | receiving slots |
| 75 | matching pins |
| 80 | first direction arrow |
| 85 | second direction arrow |
| 90 | first distance "d1" |
| 95 | upper flange surface |
| 100 | fastener |
| 105 | collar |
| 110 | second distance "d2" |
| 115 | lower fuel nozzle tip |
| 120 | third distance "d3" |
| 125 | fuel |

DETAILED DESCRIPTION OF THE PREFERRED EMBODIMENT

In accordance with the invention, the best mode is presented in terms of a preferred embodiment, herein depicted within FIGS. 1 through 4. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 4, depicting a fuel tank filler port cap with nozzle adapter (herein described as a "device") 10, where like reference numerals represent similar or like parts. In accordance with the invention, the present disclosure describes a device 10 to aid in filling fuel tanks 25 of motorcycles 15 that is intended to allow for complete filling of the tank 25 with fuel 125 while reducing spills and allowing the safety and environmental features of a vapor recovery dispensing nozzle 30 to work properly.

FIG. 1 shows an isometric view of the device 10 in a utilized state on the motorcycle 15. The device 10 is attached to a fuel tank opening 20 of the fuel tank 25 of the motorcycle 15. Further details concerning the attachment of the device 10 to the fuel tank opening 20 will be provided herein. The device 10 is used when filling the fuel tank 25 with fuel 125, preferably gasoline, by the vapor recovery dispensing nozzle 30, as provided as part of a conventional fuel dispensing system. The operation of the vapor recovery dispensing nozzle 30 functions in a manner as normally expected with no modifications.

A protective shield 35 is provided around the fuel tank opening 20 and is connected to the device 10. The protective shield 35 is preferably made of neoprene or a similar material that is not affected by the corrosive effects of the fuel 125. The protective shield 35 lays flat against an exterior surface of the fuel tank 25 and protects the surrounding area of the fuel tank 25 from accidental spills and drips when the vapor recovery dispensing nozzle 30 is inserted and removed. It is preferred that the protective shield 35 is left in place at all times, although is can be easily lifted and removed for washing or waxing of the exterior of the fuel tank 25.

The device 10 includes a fixed cover base 40, a movable inner sleeve 45, and a fuel cap 50. Further information of the exact configuration and operation of the movable inner sleeve 45 with respect to the cover base 40 and along with the fuel tank opening 20 and the fuel cap 50 will be provided herein. In the depicted orientation, the vapor recovery dispensing nozzle 30 is sealed against the movable inner sleeve 45 and thus the fuel tank opening 20 and fuel tank 25 in a generally airtight manner. Such operation is critical to the performance of the accordion-like collar 105 of most vapor recovery dispensing nozzle 30 by reducing any escaping fuel vapors in a manner which protects the environment.

Figure 2:
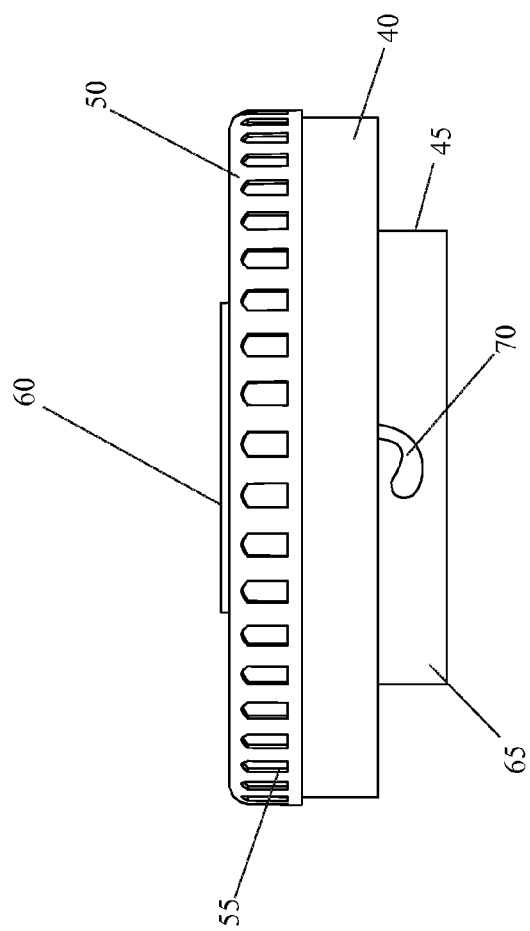
FIG. 2 is a side view of the fuel tank filler port cap with nozzle adapter, according to the preferred embodiment.

FIG. 2 shows a side view of the device 10 and more clearly depicts the cover base 40 and the fuel cap 50. The fuel cap 50 is a standard fuel cap substantially similar to standard fuel tank caps currently used on motorcycles 15. The fuel cap 50 can also be provided as part of the device 10 in a kit format as well. As such, the exact configuration and origination of the fuel cap 50 should not be interpreted as a limiting factor of the present disclosure.

The fuel cap 50 is provided with a knurled area 55 around a side peripheral surface to facilitate application and removal of the device 10. Additionally, a logo area 60 is provided on a top surface of the fuel cap 50 for commercial or advertising indicia. It is preferred that a mechanical locking device be installed in the same area as the logo area 60 if desired. This figure also depicts a bottom portion 65 of the movable inner sleeve 45 as shown extending below the cover base 40. This configuration depicts the movable inner sleeve 45 in a lowered or stowed state. Such a configuration is utilized at all times when fuel 125 is not being added to the fuel tank 25. When fuel is being added by the vapor recovery dispensing nozzle 30, as shown in FIG. 1, the movable inner sleeve 45 is raised upwardly in a raised and utilized state prior to beginning of pumping of fuel 125 and then is lowered back to the stowed state immediately afterwards.

Figure 3:
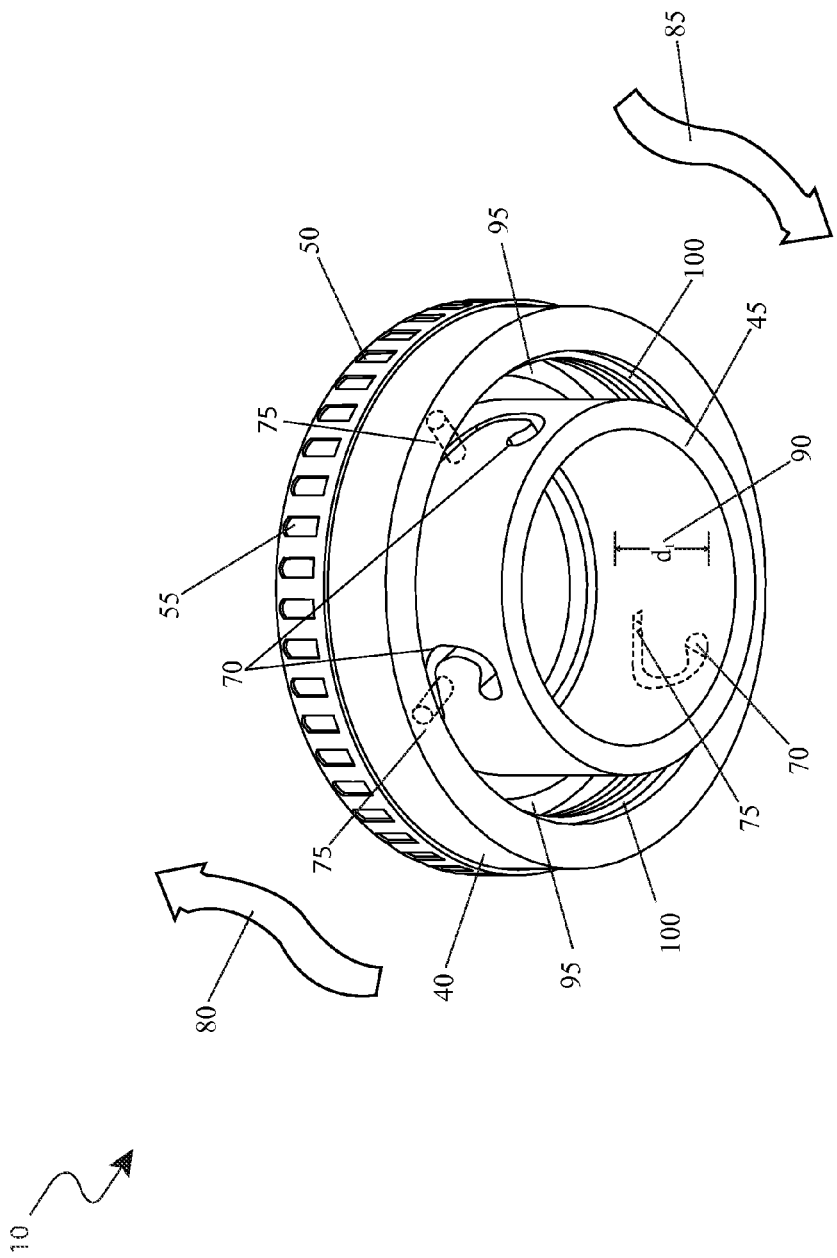
FIG. 3 is an isometric view of the fuel tank filler port cap with nozzle adapter as viewed from the bottom, according to the preferred embodiment.

This raising and lowering is accomplished manually with the use of three (3) equally-spaced receiving slots 70 and matching pins 75 (see FIG. 3). The three (3) receiving slots 70 are disposed on outer side portions of the movable inner sleeve 45 and are preferably machined into the movable inner sleeve 45 approximately one-half (½) of the wall thickness and arranged at one hundred twenty degrees (120°) from each another. Only one (1) receiving slot 70 is visible in FIG. 2 due to illustrative limitations. The matching pins 75 (neither of which are visible in this figure due to illustrative limitations) are permanently affixed to an inside surface of the cover base 40 and ride within the receiving slots 70 in an expected manner. Further detail on the usage and functionality of the receiving slots 70 and the matching pins 75 will be described herein.

FIG. 3 shows an isometric view of the device 10 as viewed from the bottom and more clearly depicts the functionality and operation of the movable inner sleeve 45 relative to the cover base 40 by the use of the receiving slots 70 and the matching pins 75. It can be seen that a lift and twist motion of the movable inner sleeve 45 with respect to the cover base 40 in one direction will raise and secure the movable inner sleeve 45 as depicted by a first direction arrow 80. When finished, the movable inner sleeve 45 is twisted and lowered as depicted by a second direction arrow 85. Each receiving slot 70 is a generally "G"-shaped channel which allows the corresponding respective pin 75 to slide therewithin. The arcuate, generally vertical portion of each slot 70 allows the pin 75 to slide and move upwardly and downwardly to move the inner sleeve 45 between the lowered state and the raised state. The generally horizontal portion of each slot 70 holds the pin 75 in position to retain the inner sleeve 45 in the raised state. Such action results in a total height differential matching the total overall offset distance of the receiving slots 70 as depicted by a first distance "d1" 90. The movable inner sleeve 45 provides an upper flange surface 95 capable of accepting the vapor recovery dispensing nozzle 30. The upper flange surface 95 is formed as an integral component which accepts and retains the vapor recovery dispensing nozzle 30 and prevents the movable inner sleeve 45 from passing through the opening defined by the cover base 40.

The device 10 is coupled to the fuel tank opening 20 by a fastener 100 provided on an interior surface of the cover base 40. The fastener 100 is shown as a threaded connection for purposes of illustration. However, it can be appreciated that other fastening means such as friction fit, cam lock, bolted flange, pressure lock and the like can be used with equal effectiveness and as such, should not be interpreted as a limiting factor of the present disclosure.

Figure 4:
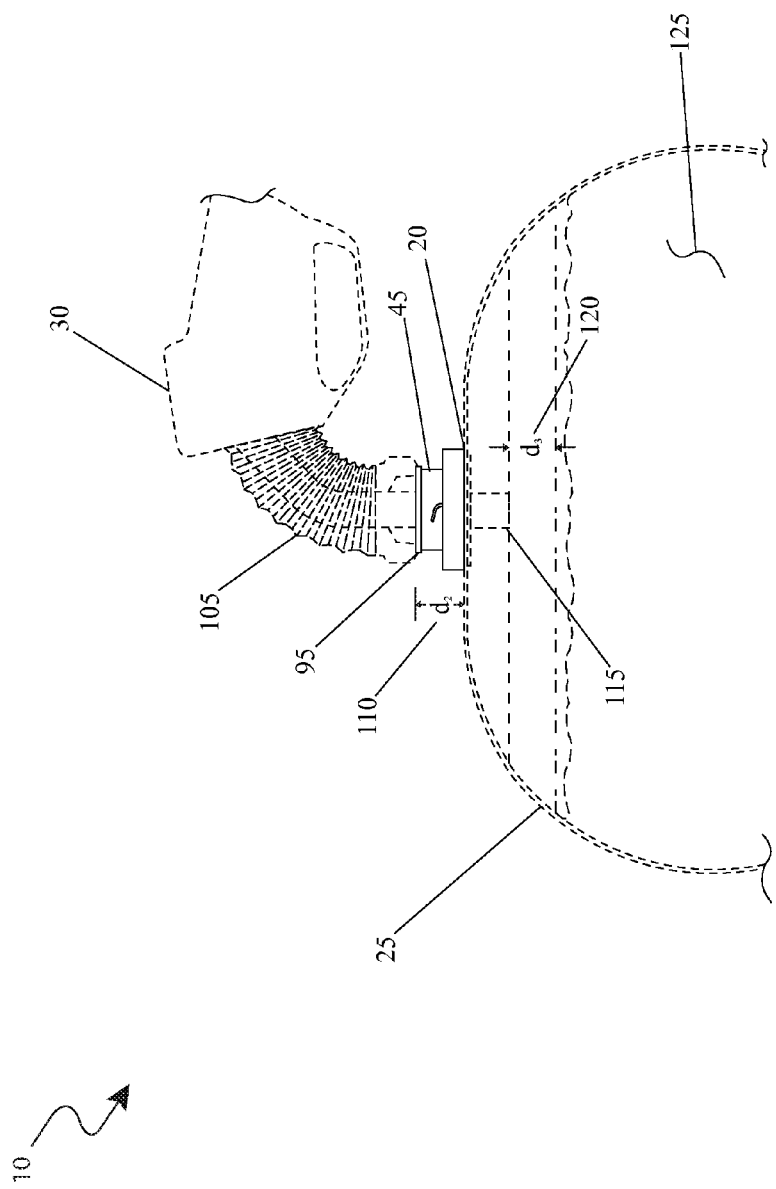
FIG. 4 is a sectional view of a motorcycle fuel tank as shown along section line I-I of FIG. 1, according to the preferred embodiment.

FIG. 4 shows a sectional view of the fuel tank 25 as shown along a section line I-I of FIG. 1 and more clearly shows the benefits provided by the device 10 during refueling operations. The movable inner sleeve 45 of the device 10 is shown in the raised and utilized state during the refueling operation. The device 10 is connected to the fuel tank opening 20 of the fuel tank 25 as previously described and the vapor recovery dispensing nozzle 30 is provided in a fueling position. As such, the accordion-like collar 105 of the vapor recovery dispensing nozzle 30 engages the upper flange surface 95 of the movable inner sleeve 45 at a higher location in relation to the fuel tank 25 than if the device 10 were not present. The engagement point of the collar 105 with the use of the device 10 compared to when the device 10 is not present is depicted by a second distance "d2" 110. While the exact length of the second distance "d2" 110 will vary per specific model of fuel tank 25 as well as differences in collar 105, the typical second distance "d2" 110 is approximately two (2) to three (3) inches. Such engagement of the second distance "d2" 110 is required for proper fuel dispensing procedures as well as forming a relatively airtight seal against the fuel tank 25. This delta difference afforded by second distance "d2" 110 results in a lower fuel nozzle tip 115 of the vapor recovery dispensing nozzle 30 being displaced in the same manner as shown by a third distance "d3" 120. This third distance "d3" 120 translates to a greater amount of gasoline 125 that is able to be placed in the fuel tank 25 before the fuel dispenser automatically shuts off. Thus, it can be seen that the use of the device 10 allows for a greater amount of fuel 125 to be placed in the fuel tank 25 at any given fill-up thus resulting in greater cruising range and increased miles between fill-ups.

It is envisioned that other styles and configurations of the present invention can be easily incorporated into the teachings of the present invention, and only one particular configuration shall be shown and described for purposes of clarity and disclosure and not by way of limitation of scope.

In accordance with the invention, the preferred embodiment can be utilized by the user in a simple and effortless manner with little or no training. It is envisioned that the device 10 be constructed in general accordance with FIG. 1 through FIG. 4. The device 10 is preferably manufactured in multiple specific models and styles to fit all specific makes and models of motorcycles 15. It is envisioned that various materials such as steel, plastic, brass and the like be used as materials of construction following well-known manufacturing techniques. It is also envisioned that the device 10 be provided as a standard or optional factory supplied accessory on new motorcycles 15 or provided as an aftermarket add-on for existing motorcycles 15.

After procurement of the device 10 it is installed by removing the factory supplied fuel cap and applying the device 10 in its place. It connects to the fuel tank opening 20 by use of the fastener 100 on the cover base 40. With it in place, the original supplied fuel cap is applied to the top of the device 10 if so designed or the fuel cap 50 as supplied with the device 10 is applied. At the same time the protective shield 35 is applied to the fuel tank 25 and connected to the cover base 40 using a suitable fastener. At this point in time the device 10 is ready for regular use.

At the time in which the motorcycle 15 requires refilling, the following procedure at the fueling station would be followed. First the fuel cap 50 is removed from the device 10 using the knurled area 55 as needed for assistance. Next, the movable inner sleeve 45 is lifted upwardly approximately two (2) to three (3) inches away from the cover base 40. In this lifting process, the movable inner sleeve 45 is also twisted approximately 10 degrees to engage the matching pins 75 with the lower portion of the receiving slots 70. Such action places the upper flange surface 95 of the movable inner sleeve 45 approximately two (2) to three (3) inches above the top surface of the fuel tank 25.

Next, the user places the vapor recovery dispensing nozzle 30 into the fuel tank 25 while engaging the collar 105 of the vapor recovery dispensing nozzle 30 upon the upper flange surface 95 of the movable inner sleeve 45. Filling with fuel 125 then takes place in a normal manner. However, it should be noted that a greater amount of fuel 125 can be placed in the fuel tank 25 due to the fact that the lower fuel nozzle tip 115 is held out of the fuel 125 at a greater height, yet still allows the vapor recovery feature of the vapor recovery dispensing nozzle 30 to function. Thus, a greater amount of fuel 125 is placed in a fuel tank 25 at any given fill-up thus resulting in greater cruising range and increased miles between fill-ups.

Upon completion of a fill-up, the vapor recovery dispensing nozzle 30 is removed, the movable inner sleeve 45 is lowered by reversing the above mentioned procedure, and the fuel cap 50 replaced thus completing the cycle and returning the device 10 to the lowered and stowed state.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A fuel tank filler port cap with a nozzle adapter comprising:
    a cover base coupled to a fuel tank having a central opening to access an interior of said fuel tank;
    an inner tubular sleeve slidably coupled within said cover base central opening;
    a cover cap removably attached to said cover base to cover said central opening; and,
    a twist and lift locking mechanism, comprising:
        a plurality of curved receiving slots disposed at least partially through a bottom portion of an exterior side surface of said inner tubular sleeve; and,
        a plurality of pins protruding inwardly from an interior surface of said cover base;
    wherein an upper end of said inner sleeve is slidable between a lowered position generally flush with a top surface of said cover base and a raised position extending outwardly from said cover base top surface;
    wherein said twist and lift locking mechanism moves said inner tubular sleeve relative to said cover base and retains said inner tubular sleeve in said raised position; and,
    wherein each of said pins insertably engages a respective slot and is slidable therewithin between said lowered position and said raised position.

2. The cap of claim 1, wherein said cover base further comprises an internal thread on a lower end to matingly attach to a threaded exterior of said fuel tank opening.

3. The cap of claim 1, wherein said cover base further comprises an external thread on an upper end to matingly attach to an internal thread of said cover cap.

4. The cap of claim 3, wherein said cover cap further comprises a knurled area disposed about an exterior peripheral side surface to provide a friction grip.

5. The cap of claim 4, wherein said cover cap further comprises an exterior top surface suitable for displaying indicia.

6. The cap of claim 5, wherein said cover cap further comprises a key locking mechanism to secure said cover cap to said cover base and prevent unauthorized access to said fuel tank interior.

7. The cap of claim 1, further comprising a protective shield affixed to a perimeter of said cover base for contacting an exterior of a fuel tank surrounding said fuel tank opening.

8. The cap of claim 7, wherein said protective shield is formed of a flexible anticorrosive material.

9. The cap of claim 1, wherein each of said pins is stationarily supported within said respective slot when said inner tubular sleeve is in the raised position.

10. The cap of claim 9, wherein said inner tubular sleeve upper end further comprises an outwardly protruding upper flange surface.

11. The cap of claim 10, wherein said plurality of pins are disposed superjacent to an internal thread of said cover base.

12. A fuel tank filler port cap with a nozzle adapter comprising:
    a cover base having an internal thread on a lower end to matingly attach to a threaded exterior of a fuel tank, an external thread on an upper end, and a central opening to access an interior of said fuel tank;
    an inner tubular sleeve slidably coupled within said cover base central opening having an outwardly protruding upper flange surface;
    a cover cap having an internal thread to matingly attach to said cover base external thread to cover said central opening; and,
    a twist and lift locking mechanism to move said inner tubular sleeve relative to said cover base, comprising:
        a plurality of curved receiving slots disposed at least partially through a bottom portion of an exterior side surface of said inner tubular sleeve; and,
        a plurality of pins protruding inwardly from an interior surface of said cover base superjacent to said internal thread;
    wherein an upper end of said inner sleeve is slidable between a lowered position generally flush with a top surface of said cover base and a raised position extending outwardly from said cover base top surface;
    wherein said twist and locking mechanism retains said inner tubular sleeve when in said raised position;
    wherein each of said pins insertably engages a respective slot and is slidable therewithin between said lowered position and said raised position; and,
    wherein each of said pins is stationarily supported within said respective slot when said inner tubular sleeve is in the raised position; and,
    wherein said inner tubular sleeve upper flange surface limits downward movement of said inner tubular sleeve relative to said cover base when in said lowered position.

13. The cap of claim 12, further comprising a protective shield affixed to a perimeter of said cover base for contacting an exterior of a fuel tank surrounding said fuel tank opening, said protective shield being formed of a flexible anticorrosive material.

14. The cap of claim 13, wherein said cover cap further comprises a knurled area disposed about an exterior peripheral side surface to provide a friction grip.

15. The cap of claim 14, wherein said cover cap further comprises a key locking mechanism to secure said cover cap to said cover base and prevent unauthorized access to said fuel tank interior.

16. The cap of claim 15, wherein said cover cap further comprises an exterior top surface suitable for displaying indicia.

17. A method of dispensing fuel into a fuel tank of a motorcycle, said method comprising the steps of:
    providing a motorcycle having a fuel tank;
    providing a fuel tank filler port cap with a nozzle adapter attachable to said motorcycle fuel tank, comprising a cover base having an internal thread on a lower end to matingly attach to a threaded exterior of a fuel tank, an external thread on an upper end, and a central opening to access an interior of said fuel tank; an inner tubular sleeve slidably coupled within said cover base central opening via a twist and lift locking mechanism comprising a plurality of curved receiving slots disposed at least partially through a bottom portion of an exterior side surface of said inner tubular sleeve, and a plurality of pins protruding inwardly from an interior surface of said cover base having an outwardly protruding upper flange surface; a cover cap having an internal thread to matingly attach to said cover base external thread to cover said central opening; and, a twist and lift locking mechanism to move said inner tubular sleeve relative to said cover base;
    providing a fuel pump assembly having a vapor recovery dispensing nozzle;
    threadably detaching said cover cap from said cover base;
    manually raising said inner tubular sleeve by simultaneously lifting upwardly and twisting said inner tubular sleeve relative to said cover base with said twist and lift locking mechanism;
    retaining said inner tubular sleeve in a raised position;
    inserting said vapor recovery dispensing nozzle within said inner tubular sleeve such that a lower fuel nozzle tip is within said fuel tank interior;
    filling said fuel tank interior with an amount of fuel;
    removing said vapor recovery dispensing nozzle from said inner tubular sleeve;
    manually lowering said inner tubular sleeve by simultaneously twisting and pushing downward said inner tubular sleeve relative to said cover base; and,
    threadably attaching said cover cap to said cover base.

\* \* \* \* \*